US012246460B2

(12) United States Patent
Godlieb et al.

(10) Patent No.: US 12,246,460 B2
(45) Date of Patent: Mar. 11, 2025

(54) RAZOR COMPRISING A HAIR-SEVERING MEMBER HAVING A PLURALITY OF SAWING TEETH

(71) Applicant: KONINKLIJKE PHILIPS N.V., Eindhoven (NL)

(72) Inventors: Robert Godlieb, Dratchen (NL); Willem Auke Westerhof, Dratchen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 267 days.

(21) Appl. No.: 17/798,594

(22) PCT Filed: Feb. 12, 2021

(86) PCT No.: PCT/EP2021/053547
§ 371 (c)(1),
(2) Date: Aug. 10, 2022

(87) PCT Pub. No.: WO2021/170432
PCT Pub. Date: Sep. 2, 2021

(65) Prior Publication Data

US 2023/0144894 A1 May 11, 2023

(30) Foreign Application Priority Data

Feb. 25, 2020 (EP) .................................... 20159374

(51) Int. Cl.
*B26B 21/40* (2006.01)
*B26B 21/38* (2006.01)
*B26B 21/56* (2006.01)

(52) U.S. Cl.
CPC .......... *B26B 21/4031* (2013.01); *B26B 21/38* (2013.01); *B26B 21/4081* (2013.01); *B26B 21/56* (2013.01)

(58) Field of Classification Search
CPC . B26B 21/4031; B26B 21/38; B26B 21/4081; B26B 21/56
See application file for complete search history.

(56) References Cited

U.S. PATENT DOCUMENTS 1,158,741 A 11/1915 Stearns
1,394,827 A 10/1921 Harshberger
(Continued)

FOREIGN PATENT DOCUMENTS

EP 1732736 A1 12/2006
EP 3388208 A1 10/2018
(Continued)

OTHER PUBLICATIONS

International Search Report and Written Opinion Dated Apr. 16, 2021 for International Application No. PCT/EP2021/053547 Filed Feb. 12, 2021.

*Primary Examiner* — Omar Flores Sanchez

(57) ABSTRACT

Razor having a hair-severing member having a plurality of sawing teeth arranged along a hair-severing edge of the hair-severing member. Each sawing tooth has a tooth tip and tooth edges mutually connected via the tooth tip. The hair-severing member is mounted for sawing through hairs present on the skin by means of the sawing teeth by moving each sawing tooth in a local direction of extension of the hair-severing edge at the position of the respective sawing tooth. A drive is coupled to the hair-severing member for driving the hair-severing member such that the sawing teeth move with an average velocity larger than or equal to 10 m/s. The spacing between the tooth tips of two successive sawing teeth is between 20 μm and 150 μm.

16 Claims, 7 Drawing Sheets

(56) References Cited

U.S. PATENT DOCUMENTS

| | | | | |
|---|---|---|---|---|
| 2,116,280 | A | 5/1938 | Parkin | |
| 5,933,964 | A | 8/1999 | Altamore | |
| 8,726,517 | B2 * | 5/2014 | Lau | B26B 19/3846 30/43.92 |
| 9,630,332 | B2 | 4/2017 | Coresh | |
| RE48,701 | E * | 8/2021 | Coresh | B26B 21/4062 |
| 2005/0252005 | A1 * | 11/2005 | Zuidervaart | B26B 21/38 30/44 |
| 2009/0307909 | A1 * | 12/2009 | Sato | B26B 19/04 30/42 |
| 2013/0160296 | A1 * | 6/2013 | Park | B26B 21/38 30/34.05 |
| 2015/0183118 | A1 | 7/2015 | Roth | |
| 2015/0352733 | A1 | 12/2015 | Floessholzer | |
| 2016/0271814 | A1 | 9/2016 | Bennik | |
| 2020/0346358 | A1 * | 11/2020 | Park | B26B 21/405 |

FOREIGN PATENT DOCUMENTS

| | | | |
|---|---|---|---|
| FR | 2379358 | A1 | 9/1978 |
| KR | 20020061370 | A | 7/2002 |
| WO | 2005/092579 | A1 | 10/2005 |
| WO | 2012022990 | A1 | 2/2012 |

* cited by examiner

RAZOR COMPRISING A HAIR-SEVERING MEMBER HAVING A PLURALITY OF SAWING TEETH

CROSS REFERENCE TO RELATED APPLICATIONS

This application is the U.S. National Phase application under 35 U.S.C. § 371 of International Application No. PCT/EP2021/053547 filed Feb. 12, 2021, which claims the benefit of European Patent Application Number 20159374.6 filed Feb. 25, 2020. These applications are hereby incorporated by reference herein.

FIELD OF THE INVENTION

The invention relates to a razor comprising a support, a skin engagement member, and a hair-severing member having a plurality of sawing teeth arranged along a hair-severing edge of the hair-severing member, wherein the hair-severing member is mounted to the support in a position relative to the skin engagement surface such that the hair-severing edge is exposed to a user's skin for sawing through hairs present on the skin by means of the sawing teeth, and wherein the hair-severing member is suspended relative to the support for allowing movement of the sawing teeth in a local direction of extension of the hair-severing edge at the position of the sawing teeth.

The invention further relates to a method of shaving hairs projecting from a skin surface by means of a razor as described here before.

BACKGROUND OF THE INVENTION

Blade shaving allows achieving a very close shave. However, an inconvenience of blade shaving (also commonly referred to as 'wet shaving') is the need of moistening the skin and the hairs, e.g. by applying water thereto and by lubricating the skin and the hairs, e.g. by applying a shaving foam. After shaving, residues of the lubricating agent need to be removed and lubricating agent is easily spoilt onto clothing, furniture or the floor. Accordingly, blade shaving has to be carried out in a bathroom-like surrounding and, even then, involves cumbersome handling of water and shaving foam. Without water and foam, hairs remain too hard, leading to high hair-cutting forces, high and painful drag forces, and fast destruction of the blade cutting edge.

Another disadvantage of blade shaving is the relatively high cost of replacing worn shaving blades, in particular if high quality blades are used.

Many attempts have been made to make shaving blades lasting longer and to improve the shaving process by reducing the hair-cutting and drag forces. One approach is to cause the cutting edge to reciprocally move in the (longitudinal) direction of extension thereof, in analogy to movement of a knife or saw during cutting. An example of a blade razor with a shaving blade having a straight cutting edge using this principle is described in U.S. Pat. No. 1,394,827. Another approach is to use a razor comprising a saw-like hair-severing member having a plurality of sawing teeth arranged in a row, wherein the sawing teeth are reciprocally driven in the direction of extension of the row. An example of a razor with a saw-like hair-severing member using this principle is described in U.S. Pat. No. 1,158,741.

In practice, such solutions have not been successful. In particular since the introduction of PTFE coated razor blades, drag occurring during hair cutting is much less of an issue, so the solutions based on movement of the cutting edge in its direction of extension became less relevant.

SUMMARY OF THE INVENTION

It is an object of the present invention to provide a razor of the type as described here before in the section "Field of the Invention" that allows the cutting of hairs close to the skin with relatively low hair-cutting forces, while generating very little friction, and with a saw-like hair-severing member having a relatively long life span.

According to the invention, this object is achieved by providing a razor and in a method according to the independent claims.

Using a razor and a method according to the invention, at each cutting instance, small amounts of hair tissue are sequentially removed from a hair by the moving tooth tips of the sawing teeth engaging that hair. Thus, the top and bottom portions of the hair are severed from each other by a number of subsequent cuts, each machining away a thin layer of the hair tissue. Since only little hair tissue is removed per passage of a sawing tooth through the hair, and since the hair does not have to be split in two at once, cutting forces exerted onto the hair and, accordingly, counter forces causing drag forces are much smaller than when the hairs are each cut by a single cut, such as by means of a non-reciprocating razor blade having a straight cutting edge. In particular, the present invention defines a number of operational and dimensional parameters of the hair-severing member, including the average velocity of the sawing teeth in the local direction of extension of the hair-severing edge and the spacing between the tooth tips, that result in effective shaving with reduced drag allowing shaving without wetting and/or lubricating the skin and without suffering from uncomfortable levels of drag on the hairs being shaved. Because the hairs are severed by sawing rather than by cutting each hair at once, the hair-severing edge of the razor according to the invention does not need to be as sharp as the cutting edge in a conventional blade razor. And because reduced drag results in slower wear of the hair-severing edge, useful shaving performance of the hair-severing member is maintained over a larger number of shaving sessions.

Particular elaborations and embodiments of the invention are set forth in the dependent claims.

Further features, effects and details of the invention appear from the detailed description and the drawings.

DETAILED DESCRIPTION OF THE EMBODIMENTS

Figure 1:
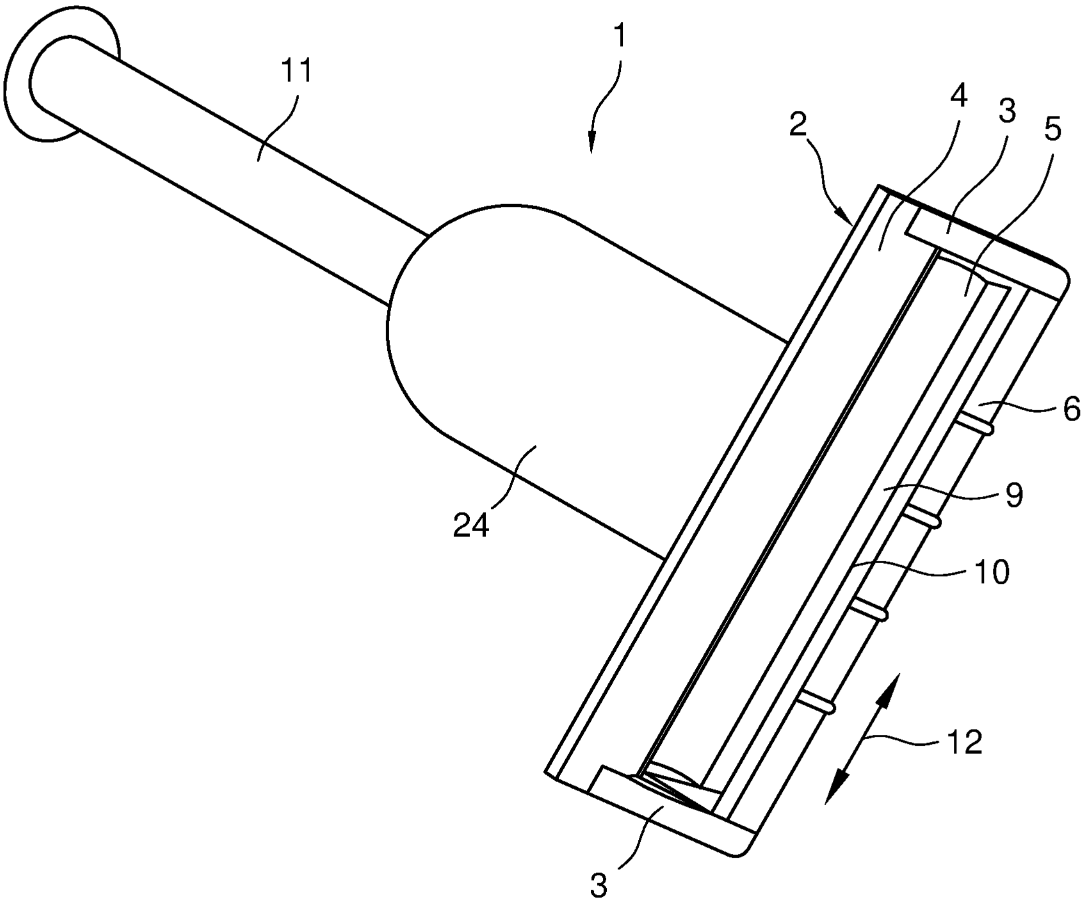
FIG. 1 is a perspective view of a first example of a razor according to the invention.

FIGS. 1-6 show a first example of a razor 1 according to the invention. The razor 1 has a support 2 and skin engagement surfaces 3-6. For severing hairs 7 projecting from a user's skin close to the level of the skin surface 8, a hair-severing member 9 having a hair-severing edge 10 is provided. The razor 1 further has a stem-shaped handle 11 for holding the razor 1 by hand. The hair-severing member 9 is mounted to the support 2 in a position relative to the skin engagement surfaces 3-6 such that the hair-severing edge 10 is exposed to the user's skin surface 8 for sawing through hairs 7 present on the skin when the skin engagement surfaces 3-6 are in contact with the skin. The hair-severing member 9 is suspended relative to the support 2 for allowing movement of the hair-severing member 9 in a direction of extension 12 of the hair-severing edge 10. In operation, the hair-severing edge 10 moves along the skin surface 8 while only slightly contacting the skin as in conventional blade shaving. In this example, the hair-severing edge 10 is straight, so the hair-severing edge 10 has a local direction of extension which remains constant along the entire length of the hair-severing edge 10. As will be illustrated by further examples, the local direction of extension of the hair-severing edge may also vary along the length of the hair-severing edge. Where, in the discussion of effects, reference is made to the 'direction of extension of the hair-severing edge', this has to be read as the 'local direction of extension of the hair-severing edge at the position of the respective sawing tooth or sawing teeth' for embodiments in which the direction of extension of the hair-severing edge varies along the length of the hair-severing edge.

Figure 4:
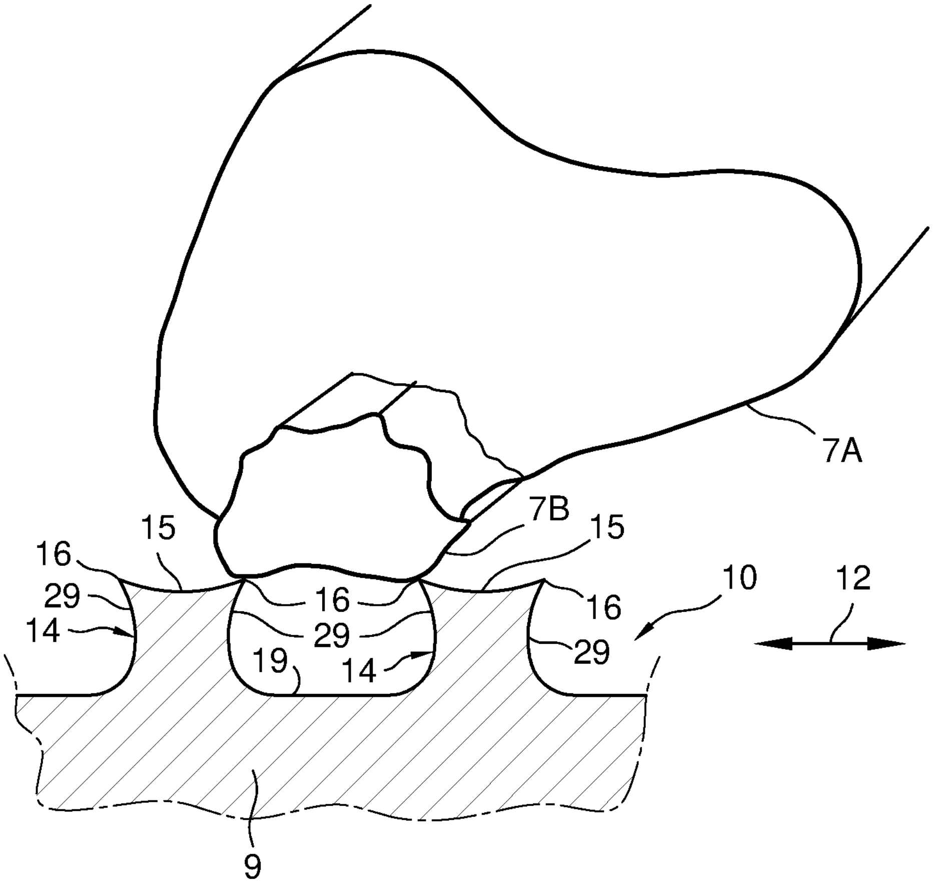
FIG. 4 is a schematic cross-sectional view of a hair-severing edge of the razor shown in FIGS. 1-3 and thin and thick beard hairs to be severed.
Figure 5:
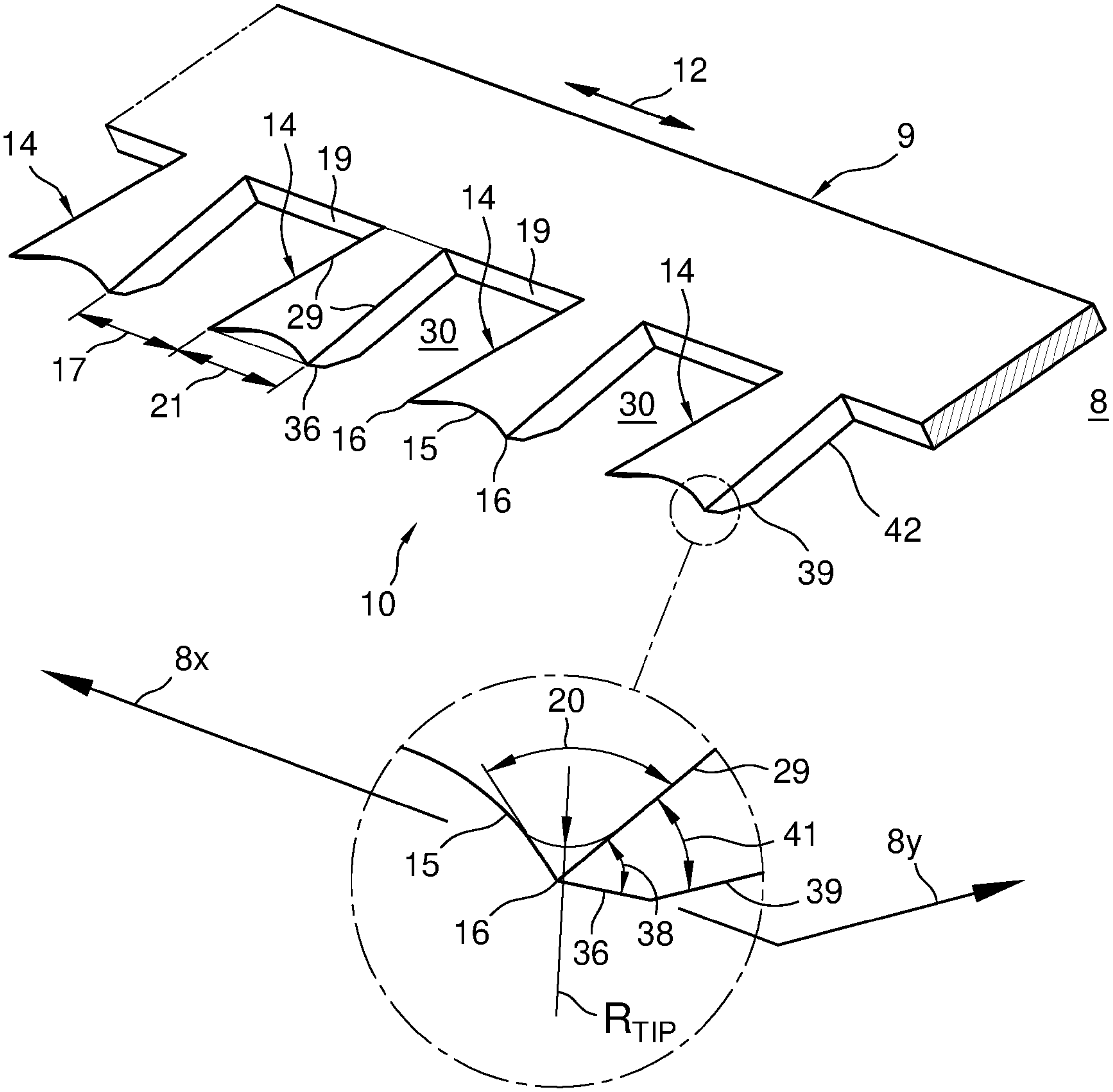
FIG. 5 is a schematic perspective view of a section of the hair-severing edge of the razor shown in FIGS. 1-3 in an operating position relative to a skin surface.
Figure 6:
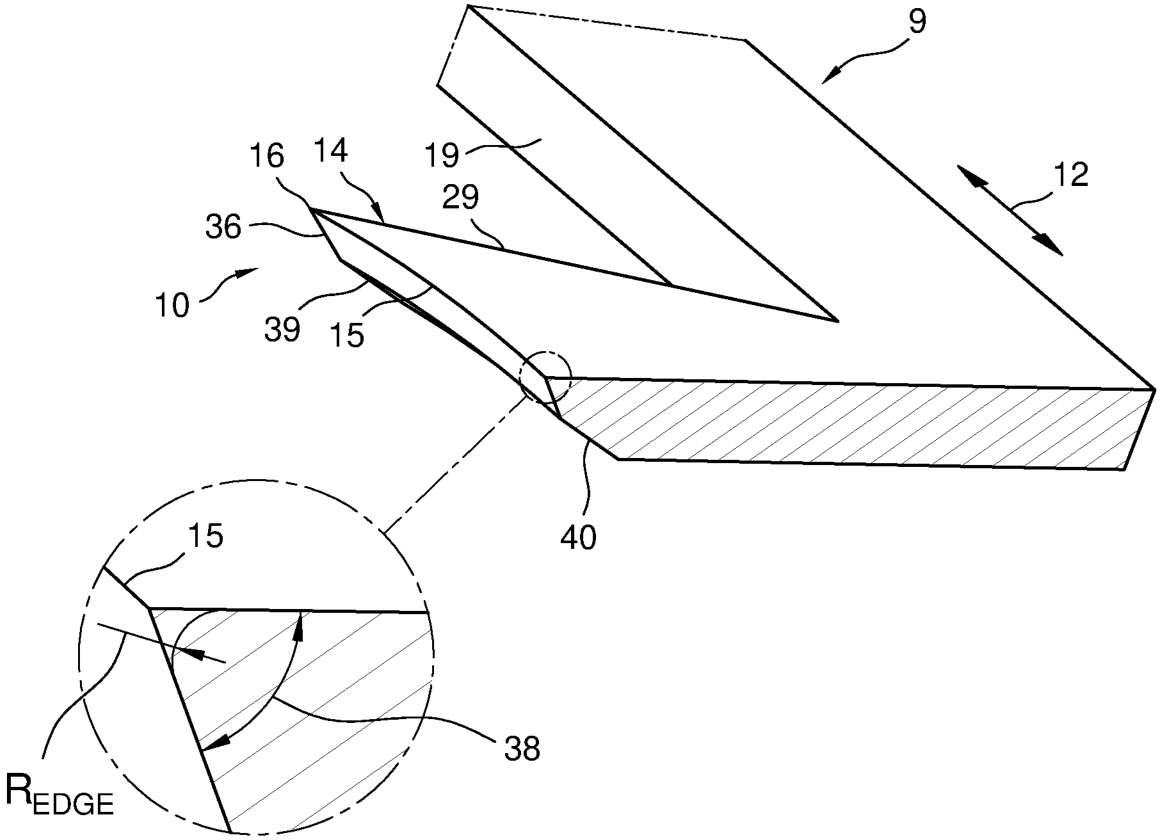
FIG. 6 is a schematic perspective view of a portion of the section shown in FIG. 5 cut-off through a sawing tooth along a plane perpendicular to a local direction of extension of the hair-severing edge at the shown sawing tooth.

The hair-severing edge 10 has a plurality of sawing teeth 14 (preferably evenly) arranged along the hair-severing edge 10 of the hair-severing member 9. In the present example, as shown in detail in FIGS. 4 and 5, the sawing teeth 14 each have two tooth tips 16 connected by a concavely shaped front tooth edge 15. The front tooth edge 15 of each sawing tooth 14 is connected to a respective one of two upper side tooth edges 29 of the sawing tooth 14 and to a respective one of two lower side tooth edges 36 of the sawing tooth 14 via a respective one of the two tooth tips 16. Each sawing tooth 14 is arranged along the hair-severing edge 10 for sawing through hairs 7 by movement in the direction of extension 12 of the hair-severing edge 10. In FIG. 5, orientations $\mathbf{8}_x$ and $\mathbf{8}_y$ of the skin surface 8 are shown in the direction of extension 12 of the hair-severing edge 10 ($\mathbf{8}_x$) and in a direction along the skin surface 8 perpendicular to the direction of extension 12 of the hair-severing edge ($\mathbf{8}_y$). Each lower side tooth edge 36 connects to a side edge 39 of a skin contacting surface 40 of the sawing tooth 14 which, as shown in FIG. 5, extends at a wedge angle 41 relative to the associated upper side tooth edge 29 which is smaller than a first tip angle 38 of the tooth tip 16 enclosed by the upper side tooth edge 29 and the lower side tooth edge 36. The wedge angle 41 between the side edge 39 of the skin contacting surface 40 and the associated upper side tooth edge 29 is preferably between 10 and 20°, so that, when the razor 1 is being used, the skin contacting surface 40 is approximately in a same plane as the skin surface 8 (in FIG. 5 defined by the directions $\mathbf{8}_x$ and $\mathbf{8}_y$).

Figure 2:
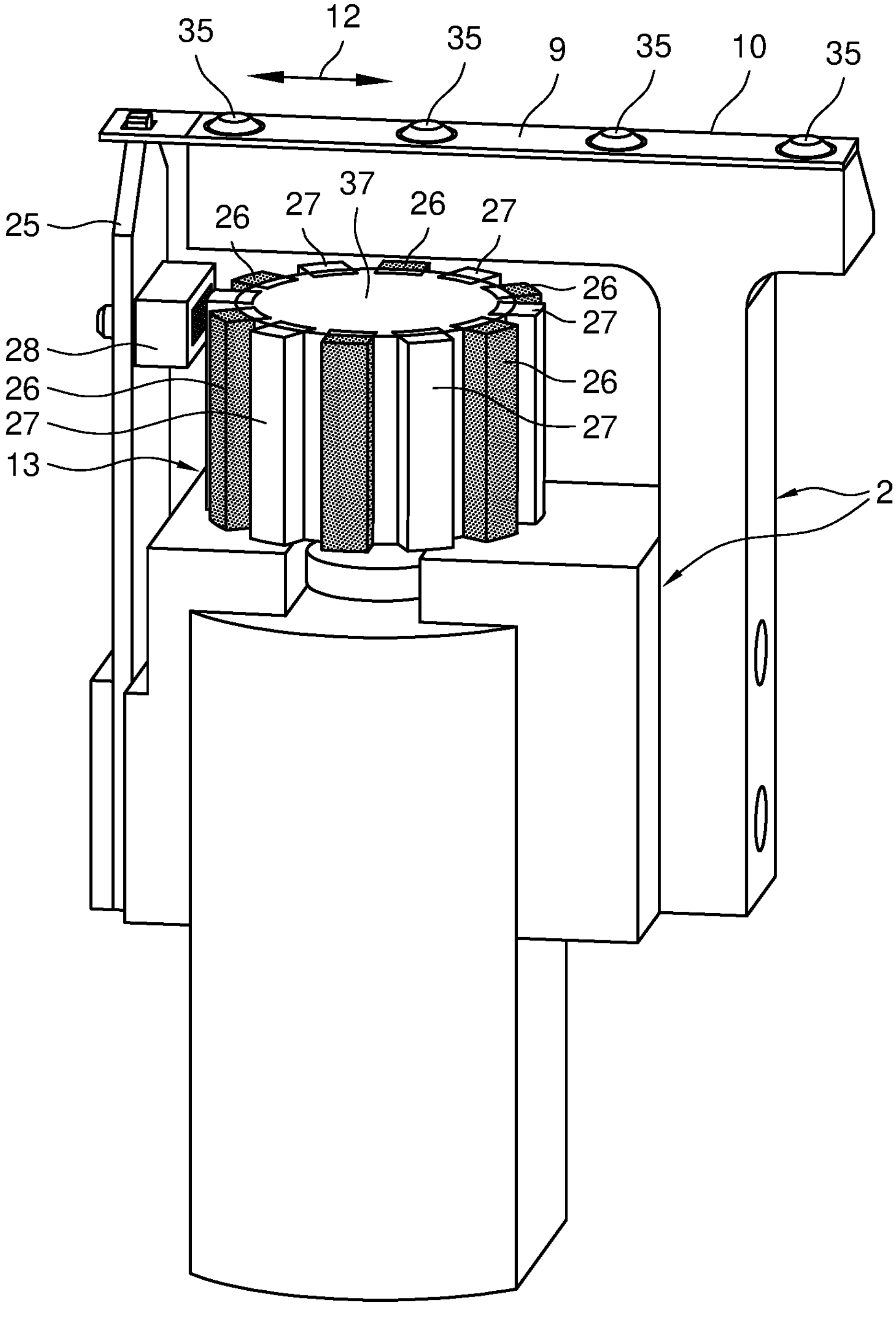
FIG. 2 is a schematic perspective view of a drive of the razor shown in FIG. 1.

As shown in FIG. 2, the razor 1 comprises a drive 13 which is coupled to the hair-severing member 9 for driving the movement of the hair-severing member 9 relative to the support 2 such that the sawing teeth 14 move in the direction of extension 12 of the hair-severing edge 10 with an average velocity larger than or equal to 10 m/s. In this example, the movement of the sawing teeth 14 is a reciprocal movement in the direction of extension 12 with said average velocity.

The thicknesses of beard hairs 7 are typically in a range from about 50 μm, for a thin beard hair, up to about 300 μm for a thick beard hair. Thus, at least the thinnest beard hairs 7B would fit in an intermediate space 30 between two successive sawing teeth 14 (a sawing tooth and the first next or previous sawing tooth) if a spacing 17 (see FIG. 5) between two successive sawing teeth 14 is larger than 50 μm. It has been found that, if beard hairs 7 are entirely caught in the intermediate space 30 between the sawing teeth, the beard hairs tend to be just reciprocally moved by the sawing teeth instead of being chipped. To avoid that thin beard hairs are just reciprocally moved and less effectively chipped, a depth 18 of the intermediate space 30 between two (preferably each pair of) successive sawing teeth 14, in a direction perpendicular to the direction of extension 12 of the hair-severing edge 10, is preferably smaller than or equal to 25 μm when the spacing 17 between the tooth tips 16 of two successive sawing teeth 14 is larger than 50 μm. The depth 18 between two successive sawing teeth 14 can be considered up to a straight bottom 19 of the intermediate space 30 as shown in FIG. 5, but the effective depth can also be determined (limited) by one or more small ridges or other projections between successive sawing teeth 14. As is shown in FIG. 4, a spacing 17 between successive sawing teeth 14 smaller than or equal to 50 μm can also prevent thin hairs 7B from fully entering the intermediate space 30 between successive sawing teeth 14, even if the depth 18 would be large enough to entirely accommodate at least thin hairs 7B.

The spacing 17 between the tooth tips 16 of two successive sawing teeth 14 is at most 150 μm, so that, for hairs with an average hair diameter, during movement of the severing edge 10 along a hair 7A or 7B, before a sawing tooth 14 leaves the hair 7, a next sawing tooth 14 already enters a groove in the hair 7 which the previous sawing tooth 14 has cut therein. For effective sawing of thin hairs 7B, it is advantageous if the spacing 17 between the tooth tips 16 of two successive sawing teeth 14 is very small, but it has also been found that, if the spacing 17 between the tooth tips 16 of two successive sawing teeth 14 is very small, debris obtained during cutting tends to remain stuck in the intermediate spaces 30 between the sawing teeth 14. Therefore, the spacing 17 is 20 μm or larger. Also, when a large number of sawing teeth 14 is simultaneously in engagement with a hair 7, the advantage of reduced cutting forces may be offset by the large sum of the cutting forces of the individual sawing teeth 14 in engagement with the hair 7. The sum of the cutting forces should preferably not exceed 0.007 N to prevent drag. This is another reason why the spacing 17 is at least 20 μm.

For avoiding the occurrence of too much drag while allowing to effectively sever hairs 7, the average velocity of the sawing teeth 14 in the direction of extension 12 of the hair-severing edge 10 is larger than or equal to 10 m/s. Each saw tooth 14 can be regarded as a small chisel which, given a certain contact stress at the hair and a lateral motion, will chip away hair tissue from the hair. It has been found that, for effectively sawing through hairs, a ratio between the velocity of the hair-severing edge 10 in its direction of extension and the velocity at which the depth of the sawing slit in the hair is increased should at least be about 100. Therefore, to be able to shave at acceptable shaving velocities, i.e. velocities in the shaving direction of the razor 1 of at least 100 mm/s, the minimal velocity of the hair-severing edge 10 in its direction of extension 12 should be larger than 100×100 mm/s=10 m/s.

The hair-severing edge 10 is preferably made of tool grade steel, but the material of the hair-severing edge 10 is not limited to tool grade steel. There are several ways for manufacturing the sawing blades, such as by chemical etching and laser ablation. However other methods, like growing nickel and a combination of processes like wire spark erosion with mechanical or chemical polishing, are also conceivable.

The front tooth edge 15 and each of the upper side tooth edges 29 of each of the sawing teeth 14 preferably enclose a second tip angle 20, as shown in FIG. 5, smaller than 80° at the tooth tip 16 to assure sufficient contact stress at the tooth tip 16. Thus, the second tip angles 20 of the tooth tips 16 between the front tooth edge 15 and each of the upper side tooth edges 29 are preferably each smaller than 80°. The first tip angles 38 of the tooth tips 16 between the upper side tooth edge 29 and the lower side tooth edges 36 of each sawing tooth 14 are preferably smaller than 80° and more preferably smaller than 60°. For sufficient sharpness of the tooth tips 16, a tip radius $R_{TIP}$ (see FIG. 5) of the tooth tips 16 is preferably equal to or smaller than 5 μm. The tip radius $R_{TIP}$ of the tooth tips 16 is schematically shown in FIG. 5. For effective sawing, the tooth edges 15, 29, 36 preferably have an edge radius $R_{EDGE}$ of 5 μm or smaller. Thus, seen in cross-section along a plane perpendicular to the tooth edge 15, 29, each tooth edge 15, 29 preferably has an edge radius $R_{EDGE}$ equal to or smaller than 5 μm. The tooth edges 15, 29, 36 preferably have such an edge radius $R_{EDGE}$ at least at the position of the tooth tips 16 and, preferably, up to a distance from the tooth tips 16. Said distance may be, for example, 25%, 50% or even 100% of the depth 18 of the intermediate space 30. The edge radius $R_{EDGE}$ of the front tooth edge 15 is shown in detail in FIG. 6.

To avoid abrasion of the skin and dragging along of the skin with the movement of the sawing teeth 14, the side edges 39 of the skin contacting surface 40, and preferably also portions of the lower side tooth edges 36 adjacent to the respective side edges 39 of the skin contacting surface 40, are preferably rounded or chamfered, for example to an edge radius larger than 5 μm and preferably larger than 10 μm. Outer ends of the side edges 39 of the skin contacting surface 40 may each be curved so as to provide smooth transitions to the lower side tooth edge 36 and a lower tooth edge 42 contiguous with that side edge 39 of the skin contacting surface 40.

Figure 3:
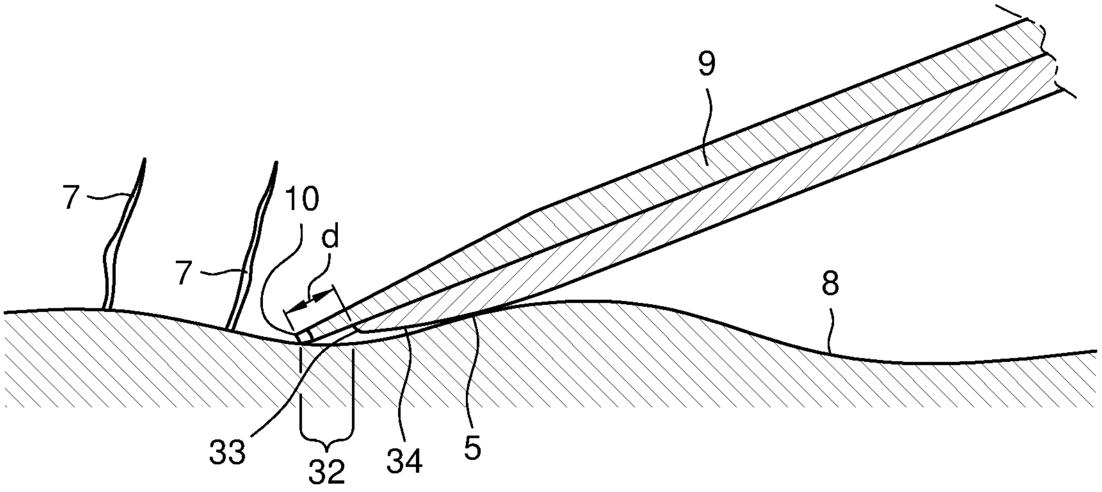
FIG. 3 is a cross-sectional side view of a portion of the razor shown in FIGS. 1 and 2, while in use.

To further limit movement of the skin induced by movement of the hair-severing member 9 contacting the skin surface 8 during use, the razor 1 according to the present example is equipped with a skin-shielding member 5, as show in FIG. 3, arranged in a stationary position relative to the support 2 at a side of the hair-severing member 9 facing the skin during use. As a result, during use the hair-severing member 9 is exposed to the skin only in an exposure area 32 between the hair-severing edge 10 and an edge 33 of the skin-shielding member 5. The exposure area 32 has a depth d between 100 and 500 μm, preferably between 250 and 350 μm, in a direction perpendicular to the direction of extension 12 of the hair-severing edge 10. Movement of the skin induced by the movement of the hair-severing member 9 reduces the effectiveness of the sawing process and is limited as much as possible by exposing the hair-severing member 9 to the skin only in the relatively small exposure area 32 that includes the hair-severing edge 10. The selected depth d of the exposure area 32 safeguards sufficient exposure of the hair-severing edge 10 to the skin and, thereby, sufficient effectivity of the sawing process of the moving hair-severing edge 10. The skin-shielding member 5 also limits skin irritation caused by contact between the moving hair-severing edge 10 and the skin, because the skin-shielding member 5 reduces the pressure at which the hair-severing edge 10 contacts the skin. The skin-facing surface 34 of the skin-shielding member 5 may be provided with a friction-reducing coating to reduce skin friction.

As shown in FIG. 5, the sawing teeth 14 each have a width 21 in the direction of extension 12 of the hair-severing edge 10 smaller than 75 μm, so that a large number of tooth tips 16 can be provided leaving a given minimum spacing 17 between each pair of successive tooth tips 16. For a double-edged (twin tip) sawing tooth 14, a width 21 of 20 μm is preferred for optimizing performance while maintaining sufficient tooth strength.

Instead of a single hair-severing member 9, one or more further hair-severing members may be provided in a razor according to the invention, wherein all hair-severing members may be coupled to the same drive arranged for driving the movement of each hair-severing member relative to the support in the direction of extension of its hair-severing edge with the average velocity larger than or equal to 10 m/s.

As mentioned here before, in the razor 1 according to the present example, the movement of the sawing teeth 14 in the direction 12 of extension of the hair-severing edge 10 is a reciprocal movement.

For high shaving performance, the sawing teeth 14 each have two tooth tips 16, so that the sawing teeth 14 cut in the two movement directions parallel to the direction 12 of extension of the hair-severing edge 10. Moreover, the second tip angle 20 of the tooth tips 16 can be smaller than 80°. Furthermore, in the present example the front tooth edges 15, that mutually connect the two tooth tips 16 of the sawing teeth 14, are concavely shaped. As a result of the concave shape of the front tooth edges 15, a hair temporarily present between the top of a sawing tooth 14 and the skin 8 does not cause the sawing tooth 14 to be lifted from the skin 8 so far that shaving performance is significantly compromised. This is the more relevant the thicker the sawing teeth 14 are.

Figure 7:
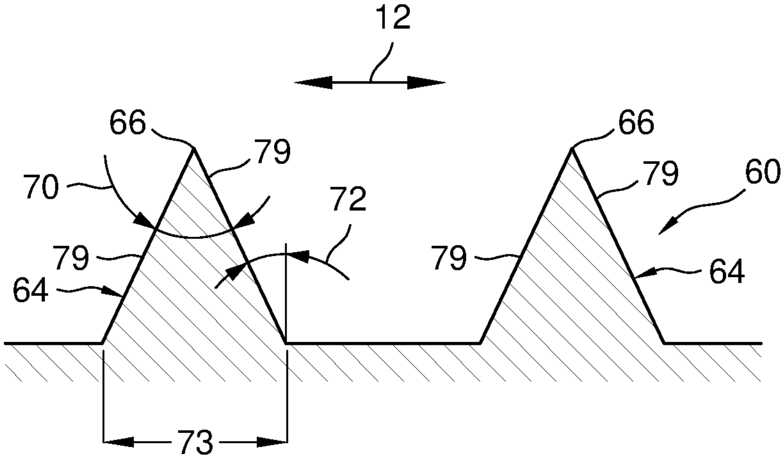
FIG. 7 is a schematic cross-sectional view of a hair-severing edge of a hair-severing member of a second example of a razor according to the invention.

In FIG. 7 a hair-severing edge 60 of a hair-severing member of a second example of a razor according to the invention is shown, which is also configured for shaving with the hair-severing edge 60 reciprocally moving in its direction of extension 12. The sawing teeth 64 each have a single tooth tip 66 at the location where the two tooth edges 79 are mutually connected. The tip angle 70 of the sawing teeth 64 is preferably smaller than 60° to keep the negative cutting (rake) angle 72 as small as possible to achieve a sufficiently high initial contact stress with the hair 7 to create an initial notch. For obtaining sufficient strength of the sawing teeth 64, the sawing teeth 64 preferably have a base width 73 of at least 20 μm.

For the sawing teeth 14 to move in the direction of extension 12 of the hair-severing edge at an average speed of at least 10 m/s, the reciprocal movement of the sawing teeth 14 preferably has a stroke length between 1 and 30 mm, and the reciprocal movement preferably has a frequency equal to or larger than 330 Hz. The combination of said stroke length and said frequency results in the required average speed of at least 10 m/s.

The drive 13 may for instance be a driven resonant system which brings and maintains a mass-spring system in a resonating movement relative to a main body. An example of such a driven resonant system is schematically shown in FIG. 2 and can be accommodated in a housing portion 24 of the handle 11. The hair-severing member 9 is movably guided in the direction of extension 12 relative to the support 2 by means of a plurality of guiding members 35 and is attached to a first end of a leaf spring 25 of which an opposite second end is fixedly connected to the support 2. The leaf spring 25 has a stiffness such that, in combination with the mass of the hair-severing member 9 connected thereto, it is 'resonant' in an Eigen frequency that matches the desired frequency of the reciprocal movement of the hair severing member 9 in its direction of extension 12, for instance 7700 Hz at a stroke length of 1.3 mm. To drive movement at such a high frequency without using a motor revolving at the same rpm or a very high frequency linear electric motor, a rotatable driven drum 37 carrying multiple alternately polarized magnets 26, 27 and a counter magnet 28 attached to the leaf spring 25 can be used. In operation, the counter magnet 28 is attracted or pushed away by a passing magnet 26, 27 during rotation of the drum 37. In this example the excitation frequency of the leaf spring 25 is six times the number of rotations per unit of time of the drum 37. Such a multiplication of the excitation frequency allows use of a standard electric motor for achieving a high excitation frequency. Moreover, the excitation frequency can be an undertone of the Eigen frequency of the mass-spring system formed by the leaf spring 25 and the hair-severing member 9.

Figure 8:
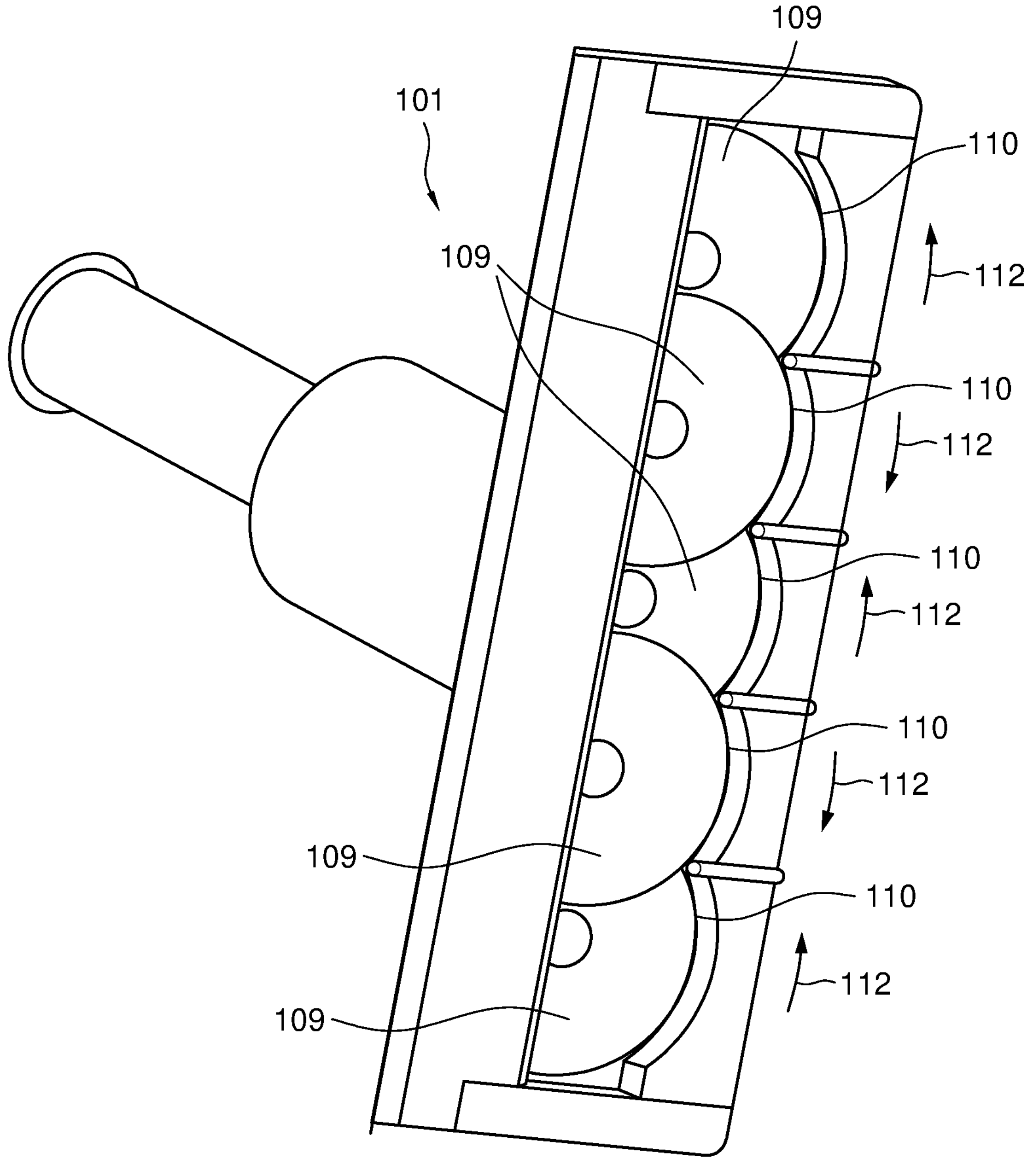
FIG. 8 is a perspective view of a third example of a razor according to the invention.

In FIG. 8 a third example of a razor 101 according to the invention is shown. In this example, the hair-severing edges 110 of the hair-severing members 109 have a local direction of extension which varies along the hair-severing edges 110. Accordingly, the direction of movement of the sawing teeth of the hair-severing edges 110 varies along the hair-severing edges 110. In particular, each sawing tooth moves in the local direction of extension 112 of the associated hair-severing edge 110 at the position of the sawing tooth. In particular, in this example the sawing teeth of the hair-severing edges 110 move in the respective local directions of extension of the hair-severing edges according to a rotational movement in a single direction. For this purpose, the hair-severing members 109 are provided in the form of circular saw blades having circular hair-severing edges 110. However, other ways to create a continuous motion in a single direction are also conceivable, such as a band saw and a chain saw system. In all such systems, the hair-severing edges can in principle also be driven so as to move in a reciprocating fashion.

To obtain sufficiently long operative sections of the hair-severing edges 110 in a construction that is sufficiently compact for daily use and can easily be taken along when travelling, the hair-severing edges 110 of the hair-severing members 109 preferably have a diameter between 5 and 75 mm.

The drive for rotationally driving the hair-severing members 109 is preferably arranged for rotating the hair-severing members 109 about an axis of rotation at speeds of at least 2500 rpm. Such speeds in combination with the diameter of the hair-severing edges 110 as described here before are suitable to achieve the required average velocity of the sawing teeth of at least 10 m/s.

Figure 9:
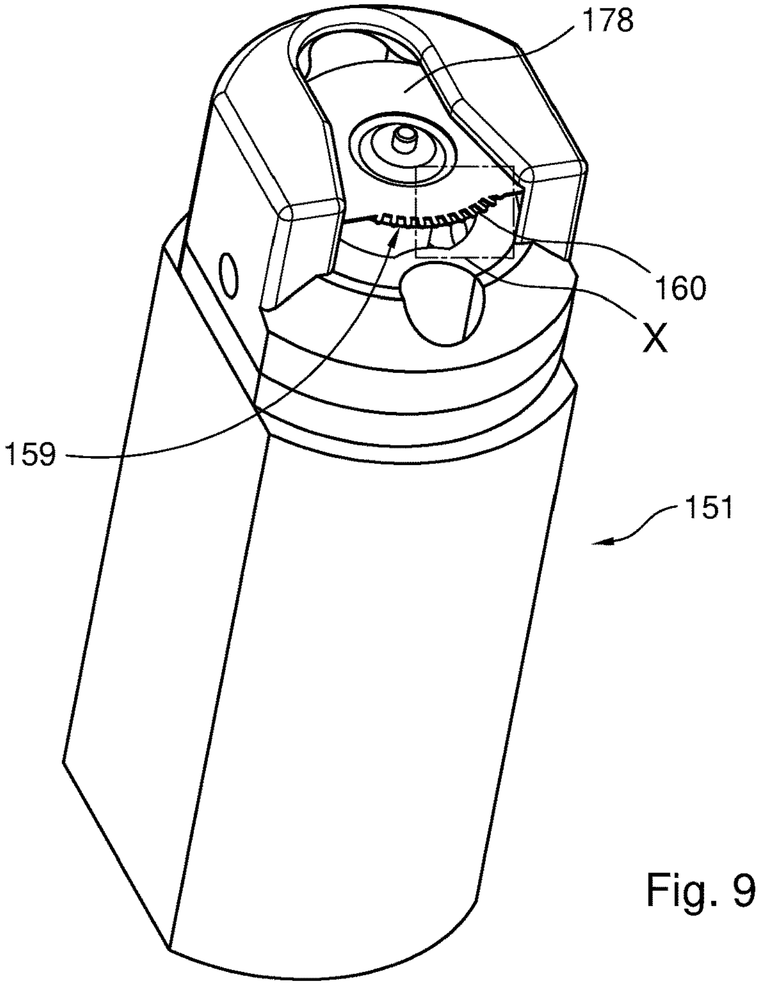
FIG. 9 is a perspective view of a fourth example of a razor according to the invention.
Figure 10:
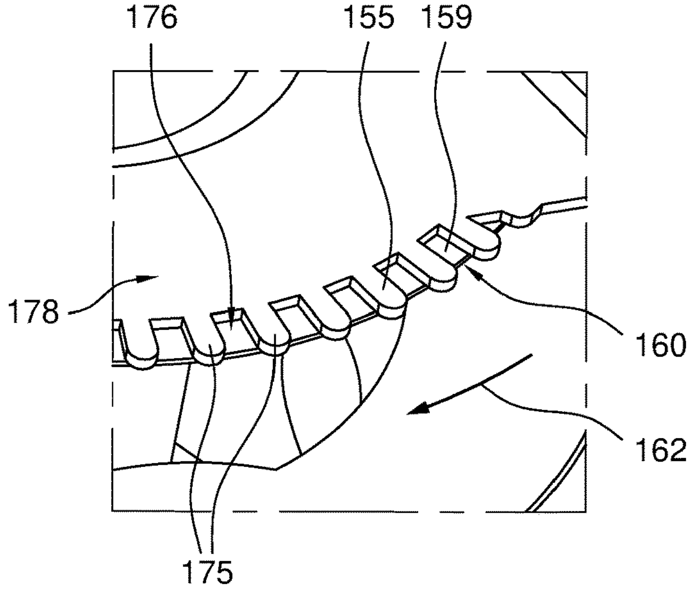
FIG. 10 is an enlarged view of a portion X of the razor indicated in FIG. 9.

In FIGS. 9 and 10, a fourth example of a razor 151 according to the invention is shown, in which the movement of the sawing teeth (not individually visible in FIGS. 9 and 10) of the hair-severing edge 160 of the hair-severing member 159 in the local direction of extension 162 of the hair-severing edge 160 is a continuous rotational movement in a single direction. The rotational movement can be along any rotational trajectory, for instance as in a chain-saw or a flexible band-saw. In this example, the hair-severing member 159 is provided in the form of a single circular saw blade to achieve the rotational movement of the hair-severing edge 160. For protecting the skin from being damaged or irritated by the rotating hair-severing member 159, a skin-shielding member 178 is provided, which has comb teeth 175 with a skin engagement surface 155 contacting the skin during shaving. Between these comb teeth 175, open spaces 176 are present into which the skin can bulge into a position close to or slightly in contact with the hair-severing edge 160.

As in the other examples, the hair-severing effect is achieved by sawing through the hairs at or in close proximity to the skin surface. In particular, the sawing teeth of the hair-severing edge 160 do not interact with the comb teeth 175 of the skin shielding member 178 to act as a pair of co-operating hair-cutting teeth as in conventional electrical shaver and trimmers with a moving cutting member moving relative to and co-operating with a stationary cutting member.

While the invention has been described and illustrated in detail in the foregoing description and in the drawing figures, such description and illustration are to be considered exemplary and/or illustrative and not restrictive; the invention is not limited to the disclosed embodiments.

Several features have been described as part of the same or separate embodiments. However, it will be appreciated that the scope of the invention also includes embodiments having combinations of all or some of these features other than the specific combinations of features embodied in the examples.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. For the purpose of clarity and a concise description, features are disclosed herein as part of the same or separate embodiments; however, it will be appreciated that the scope of the invention may include embodiments having combinations of all or some of the features disclosed. The mere fact that certain measures are recited in mutually different dependent claims does not indicate that a combination of these measures cannot be used to advantage. Any reference signs in the claims should not be construed as limiting the scope.

The invention claimed is:

1. A razor comprising:

a support;

a skin engagement surface;

a hair-severing member having a plurality of sawing teeth arranged along a hair-severing edge of the hair-severing member, each sawing tooth of the plurality of sawing teeth having a tooth tip and tooth edges mutually connected via the tooth tip, wherein a spacing between tooth tips of two successive sawing teeth is between 20 μm and 150 μm;

wherein the hair-severing member:

is mounted to the support in a position relative to the skin engagement surface such that the hair-severing edge is exposed to skin of a user for sawing through hairs present on the skin by means of the sawing teeth when the skin engagement surface is in contact with the skin, and is suspended relative to the support for allowing movement of each sawing tooth in a respective local direction of extension of the hair-severing edge at a position of the sawing tooth; and a drive coupled to the hair-severing member for driving the hair-severing member relative to the support such that each sawing tooth moves in the respective local direction of extension of the hair-severing edge with an average velocity larger than or equal to 10 m/s.

2. The razor according to claim 1, wherein, when the spacing between the tooth tips of two successive sawing teeth is larger than 50 μm, a depth of an intermediate space between the two successive sawing teeth, in a direction perpendicular to the local direction of extension of the hair-severing edge, is smaller than or equal to 25 μm.

3. The razor according to claim 1, wherein the tooth edges of the sawing teeth enclose a tip angle smaller than 80° at the tooth tip.

4. The razor according to claim 1, wherein the tooth tips of the sawing teeth have a tip radius equal to or smaller than 5 μm.

5. The razor according to claim 1, wherein the tooth edges of the sawing teeth have an edge radius equal to or smaller than 5 μm at least at a position of the tooth tip.

6. The razor according to claim 1, further comprising a skin-shielding member arranged in a stationary position relative to the support at a side of the hair-severing member facing the skin during use, whereby during use the hair-severing member is exposed to the skin only in an exposure area between the hair-severing edge and an edge of the skin-shielding member, said exposure area having a depth between 100 μm and 500 μm in a direction perpendicular to the local direction of extension of the hair-severing edge.

7. The razor according to claim 6, wherein said depth of the exposure area is between 250 μm and 350 μm.

8. The razor according to claim 1, wherein each sawing tooth bas a width in the respective local direction of extension of the hair-severing edge smaller than 75 μm.

9. The razor according to claim 1, wherein at least one of the sawing teeth has two tooth tips mutually connected by a concavely shaped front tooth edge of the sawing tooth.

10. The razor according to claim 1, wherein the drive is arranged to move the hair-severing member such that the each sawing tooth moves in the respective local direction of extension of the hair-severing edge according to a reciprocal movement.

11. The razor according to claim 10, wherein the reciprocal movement has a stroke length between 1 and 30 mm and a frequency equal to or larger than 330 Hz.

12. The razor according to claim 1, wherein the drive is arranged to move the hair-severing member such that each sawing tooth moves in the respective local direction of extension of the hair-severing edge according to a rotational movement in a single direction.

13. The razor according to claim 12, wherein the hair-severing edge of the hair-severing member is circular and has a diameter between 5 and 75 mm, and wherein the drive is arranged for rotating the hair-severing member about an axis of rotation at a speed of at least 2500 rpm.

14. A method of shaving hairs projecting from a skin surface, the method comprising:

providing a razor comprising:

a support;

a skin engagement surface;

a hair-severing member having a plurality of sawing teeth arranged along a hair-severing edge of the hair-severing member, each sawing tooth of the plurality of sawing teeth having a tooth tip and tooth edges mutually connected via the tooth tip, wherein a spacing between tooth tips of two successive sawing teeth is between 20 μm and 150 μm, wherein the hair-severing member is mounted to the support in a position relative to the skin engagement surface such that the hair severing edge is exposed to skin of a user for sawing through hairs present on the skin by means of the sawing teeth when the skin engagement surface is in contact with the skin, and is suspended relative to the support for allowing movement of each sawing tooth in a respective local direction of extension of the hair-severing edge at a position of the sawing tooth; and driving the hair-severing member of the razor relative to the support of the razor, using a drive coupled to the hair-severing member, such that each sawing tooth of the hair-severing member moves in the respective local direction of extension of the hair-severing edge of the hair-severing member with an average velocity larger than or equal to 10 m/s.

15. A razor comprising:

a support;

a skin engagement surface; and a hair-severing member having a hair-severing edge and a plurality of sawing teeth arranged along the hair-severing edge, each sawing tooth of the plurality of sawing teeth having a tooth tip and tooth edges mutually connected via the tooth tip, wherein a spacing between tooth tips of two successive sawing teeth is between 20 μm and 150 μm;

wherein the hair-severing member is mounted to the support in a position relative to the skin engagement surface such that the hair-severing edge is exposed to skin of a user for sawing through hairs present on the skin by means of the sawing teeth when the skin engagement surface is in contact with the skin, wherein the hair-severing member is suspended relative to the support to enable movement of each sawing tooth in a respective local direction of extension of the hair-severing edge at a position of the sawing tooth; and a drive coupled to the hair-severing member and configured to drive the hair-severing member relative to the support such that each sawing tooth moves in the respective local direction of extension of the hair-severing edge according to a rotational movement in a single direction.

16. The razor according to claim 15, wherein the hair-severing edge of the hair-severing member is circular and has a diameter between 5 and 75 mm, and wherein the drive configured to rotate the hair-severing member about an axis of rotation at a speed of at least 2500 rpm.

* * * * *